US008593543B2

(12) United States Patent
Kobayashi

(10) Patent No.: US 8,593,543 B2
(45) Date of Patent: Nov. 26, 2013

(54) IMAGING APPARATUS

(75) Inventor: Hideki Kobayashi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 71 days.

(21) Appl. No.: 13/288,567

(22) Filed: Nov. 3, 2011

(65) Prior Publication Data

US 2012/0113288 A1 May 10, 2012

(30) Foreign Application Priority Data

Nov. 4, 2010 (JP) ................................ 2010-246969

(51) Int. Cl.
*H04N 5/262* (2006.01)
(52) U.S. Cl.
USPC ..................................... 348/239; 348/208.16
(58) Field of Classification Search
USPC ........ 348/208.1, 208.16, 208.2, 208.4, 208.5, 348/239, 333.01, 333.02, 345; 382/264, 382/276, 282, 283
See application file for complete search history.

(56) References Cited

U.S. PATENT DOCUMENTS

| 7,554,578 | B2* | 6/2009 | Molgaard ................... 348/231.3 |
| 2007/0180718 | A1* | 8/2007 | Fourquin et al. ........... 33/366.11 |
| 2011/0134311 | A1* | 6/2011 | Nagao ........................... 348/349 |
| 2011/0193984 | A1* | 8/2011 | Kitaya et al. ............... 348/222.1 |
| 2011/0259721 | A1* | 10/2011 | Hoffman et al. .............. 200/339 |

FOREIGN PATENT DOCUMENTS

| JP | 2009-232408 A | 10/2009 |
| JP | 2010-130633 A | 6/2010 |

* cited by examiner

*Primary Examiner* — Aung S Moe
*Assistant Examiner* — Chriss Yoder, III
(74) *Attorney, Agent, or Firm* — Dickstein Shapiro LLP

(57) ABSTRACT

An imaging apparatus includes: an image sensor that converts an optical image to electronic image information; an image processor that carries out image processing on the electronic image information obtained via the image sensor to obtain image data; a tilt angle detector that detects a tilt angle of the imaging apparatus; an image display that displays the image data; and a blurred area setter that sets a blurred area and a non-blurred area to the image data in cooperation with the image processor and the image display, wherein a blurred area automatic changer that automatically changes the blurred area and the non-blurred area on the image display in accordance with the tilt angle of the imaging apparatus obtained by the tilt angle detector is provided in the image processor.

9 Claims, 14 Drawing Sheets

IMAGING APPARATUS

CROSS-REFERENCE TO RELATED APPLICATIONS

The present application is based on and claims priority from Japanese patent application No. 2010-246969, filed Nov. 4, 2010, the disclosure of which is hereby incorporated by reference herein its entirety.

BACKGROUND

The present invention relates to the improvement of an imaging apparatus having a mode to produce an image so as to make it appear as if said image had been taken using a tilt-shift lens, by performing a blurring operation on a photographed image in the horizontal or vertical direction.

A known digital camera as an imaging apparatus has a mode to produce an image so as to make it appear as if said image had been photographed using a tilt-shift lens, by performing a blurring operation on a photographed image in the horizontal or vertical direction. In other words, said imaging apparatus has a mode in order to produce an image so as to make it appear as if said image had been photographed as a miniature-faking distant view (hereinafter, referred to as miniature mode).

In this conventional imaging apparatus, a user can set a correction amount and a correction position of a part on which a blurring operation is performed before shooting.

As a technique similar to an embodiment of the present invention, an imaging apparatus is known which includes a tilt information-obtaining device that detects a tilt angle, a focal length information-obtaining device that obtains focal length information of a photographing optical system, a photographic subject distance information-obtaining device that obtains photographic subject distance information of a main photographic subject, a calculator that calculates a tilt-shift adjusting angle based on the tilt angle, focal length information, and photographic subject distance information, and a tilt-shift adjusting device that adjusts the tilt angle of an image sensor with respect to an optical axis based on the calculated tilt-shift adjusting angle, an imaging apparatus that automatically carries out a tilt-shift adjustment by using tilt information without inputting distance information and parameters (see Japanese patent application publication number 2010-130633).

SUMMARY

However, in an imaging apparatus that is capable of photographing in a conventional miniature mode, it is only possible to perform a blurring operation on a photographed image under a condition set before shooting. Therefore, in the case where a blurred area is set under a condition of photographing a photographic subject in a state where an imaging apparatus is in a horizontal state, if a user wishes to photograph the photographic subject in a state where the imaging apparatus is tilted to the horizontal state, that is, if the user wishes to photograph the photographic subject to perform the blurring operation on a photographed image as a composition, whereby the imaging apparatus is tilted to the photographic subject, the user has to change the setting of the blurring operation, and accordingly it is inconvenient to the user. There is also a problem in that while changing the setting of the blurred area for the photographed image, a scene that the user wishes to photograph disappears, and the user loses a photo opportunity.

The present invention provides an imaging apparatus that is capable of automatically performing a change of the setting of the blurred area in accordance with the tilt angle of the imaging apparatus, and improving user-usability.

In order to achieve the above objective, the embodiment of the present invention provides an imaging apparatus, comprising: an image sensor that converts an optical image to electronic image information; an image processor that carries out image processing on the electronic image information obtained via the image sensor to obtain image data; a tilt angle detector that detects a tilt angle of the imaging apparatus; an image display that displays the image data; and a blurred area setter that sets a blurred area and a non-blurred area to the image data in cooperation with the image processor and the image display, wherein a blurred area automatic changer that automatically changes the blurred area and the non-blurred area on the image display in accordance with the tilt angle of the imaging apparatus obtained by the tilt angle detector is provided in the image processor.

BRIEF DESCRIPTION OF THE DRAWINGS

FIG. 6A illustrates a state where a roll angle is 0 degrees, FIG. 6B illustrates a state where a roll angle is 45 degrees, and FIG. 6C illustrates a state where a roll angle is 180 degrees.

DETAILED DESCRIPTION OF THE PREFERRED EMBODIMENTS

Embodiment

Hereinafter, an example of an imaging apparatus according to an embodiment of the present invention will be explained with reference to the drawings.

Figure 1:
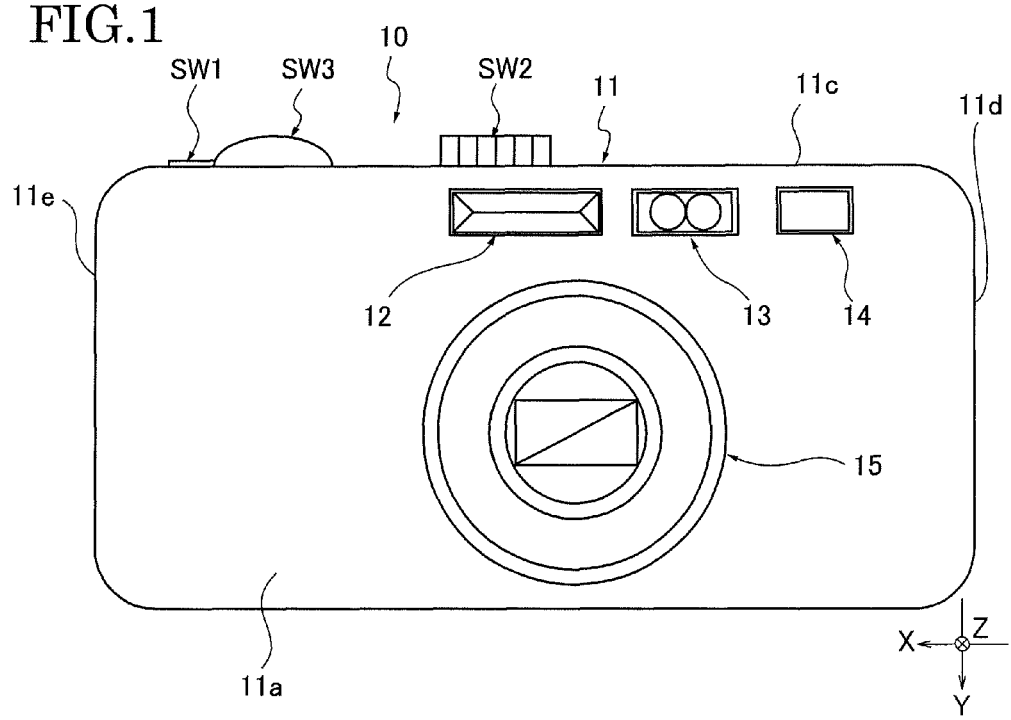
FIG. 1 is a front view schematically illustrating an imaging apparatus according to an embodiment of the present invention.
Figure 2:
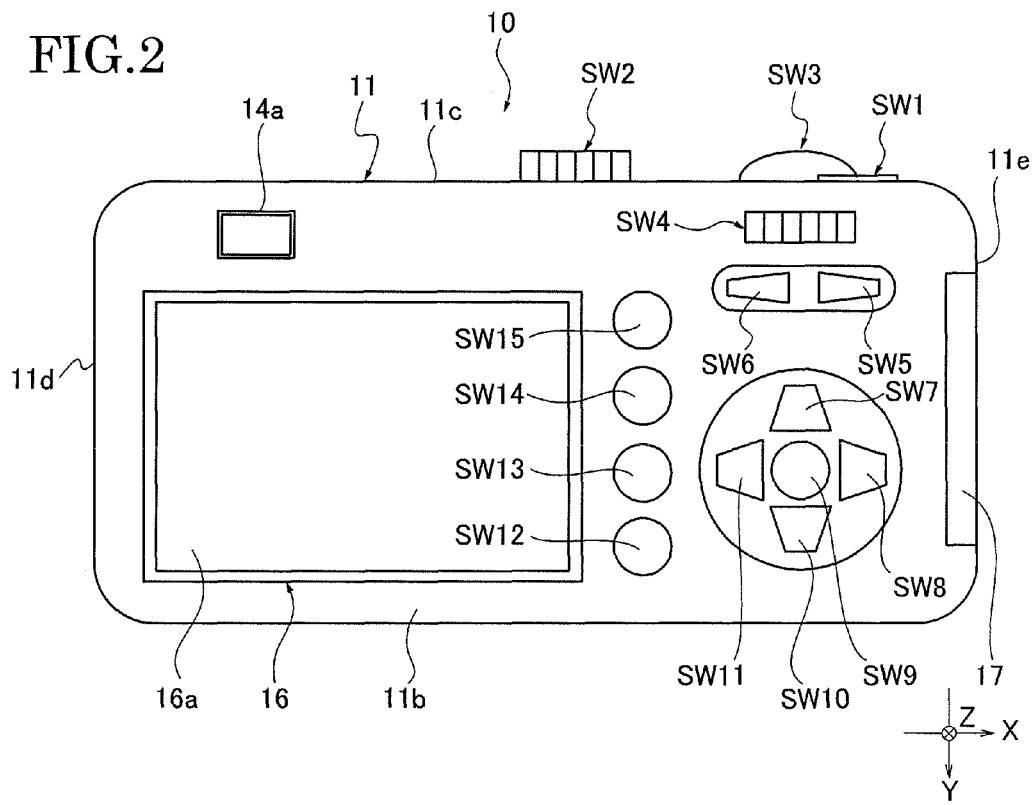
FIG. 2 is a rear view schematically illustrating the imaging apparatus according to the embodiment of the present invention.
Figure 3:
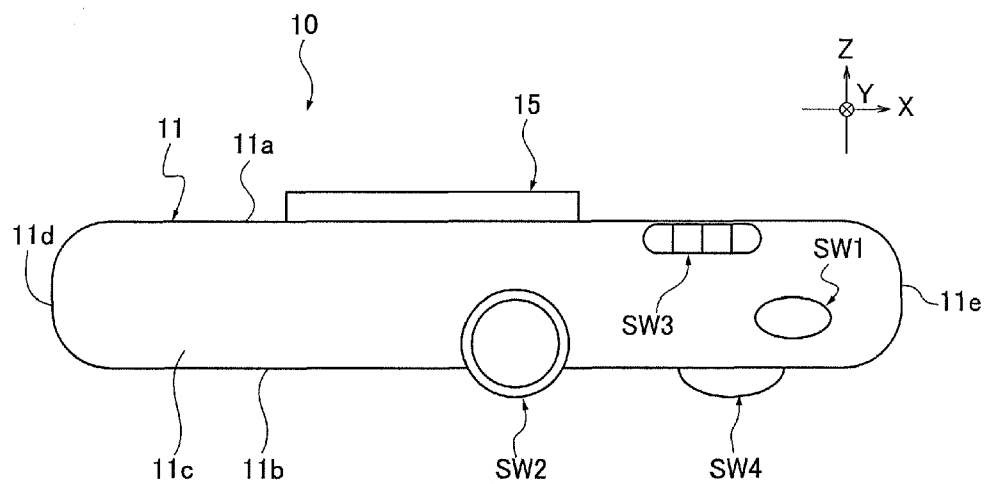
FIG. 3 is a top view schematically illustrating the imaging apparatus according to the embodiment of the present invention.

FIGS. 1 to 3 are external views schematically illustrating the imaging apparatus 10 according to the embodiment of the present invention. FIG. 1 is a front view, FIG. 2 is a rear view, and FIG. 3 is a top view. In the following explanation, as illustrated by arrows in each drawing, in the imaging apparatus 10, a direction of gravity is defined as a Y-axis, a photographing optical axis O is defined as a Z-axis, and a direction perpendicular to a plane including the Y-axis and Z-axis (horizontal direction or lateral direction) is defined as an X-axis.

Additionally, in the following explanation, a central processing unit, an image display including a liquid crystal display element, and an image sensor including a charge-coupled element are referred to as a CPU, an LCD, and a CCD, respectively. In addition, in the following explanation, a side illustrated in FIG. 1, a side illustrated in FIG. 2, a side illustrated in FIG. 3, and a right side and a left side in the optical axis direction when the imaging apparatus 10 is seen from the rear side are referred to as a front face 11a, a rear face 11b, a top face 11c, a right side face 11e, and a left side face 11d, respectively.

In this case, the imaging apparatus 10 is a digital camera. An external form of the imaging apparatus 10, as illustrated in FIGS. 1 to 3, is formed of a body case (imaging apparatus) 11 that is in a rectangular parallelepiped shape. On the front face 11a, a flash 12, a distance metering unit 13, and an optical viewfinder 14 are provided. In the vicinity of the center of the front face 11a, a lens barrel unit 15 including a photographing lens is provided.

On the top face 11c of the body case 11, a release switch (shutter release button) SW1, a mode dial SW2, and a first jog dial SW3 are provided.

On the rear face 11b of the body case 11, an LCD monitor 16, a second jog dial SW4, a zoom switch [TELE] SW5, a zoom switch [WIDE] SW6, an up-direction instruction switch SW7, a right-direction instruction switch SW8, an OK switch SW9, a left-direction instruction switch SW10, a down-direction instruction and macro switch SW11, a display switch SW12, a delete switch SW13, a menu switch SW14, a power switch SW15, and an eyepiece part 14a of the optical viewfinder 14 are provided.

The LCD monitor 16 is provided such that a longitudinal direction of the LCD monitor 16 corresponds to an X-axis direction when holding the imaging apparatus 10 horizontally. The LCD monitor 16 has a rectangular image display screen (monitor screen) 16a that is horizontally long (longer in the X-axis direction), and is capable of displaying an obtained image, an operation menu, and so on.

In this specification, when the switches SW1 to SW15 are expressed as a group of switches, they are referred to as an operation key unit. The operation key unit comprises operation keys operated by a user. On the right side face 11e of the body case 11, a battery cover 17 that is openable and closable for changing batteries and so on is provided.

The imaging apparatus 10 is capable of selecting various functions by appropriately operating direction instruction switches SW7, SW8, SW10, SW11, and photographing a photographic subject by pressing and operating the release switch SW1. In addition, the imaging apparatus 10 is capable of photographing a photographic subject while displaying an image of the photographic subject on the image display screen 16a of the LCD monitor 16. The external view of the imaging apparatus 10 according to the embodiment of the present invention is not limited to the present embodiment, and a different external view may be provided.

Figure 4:
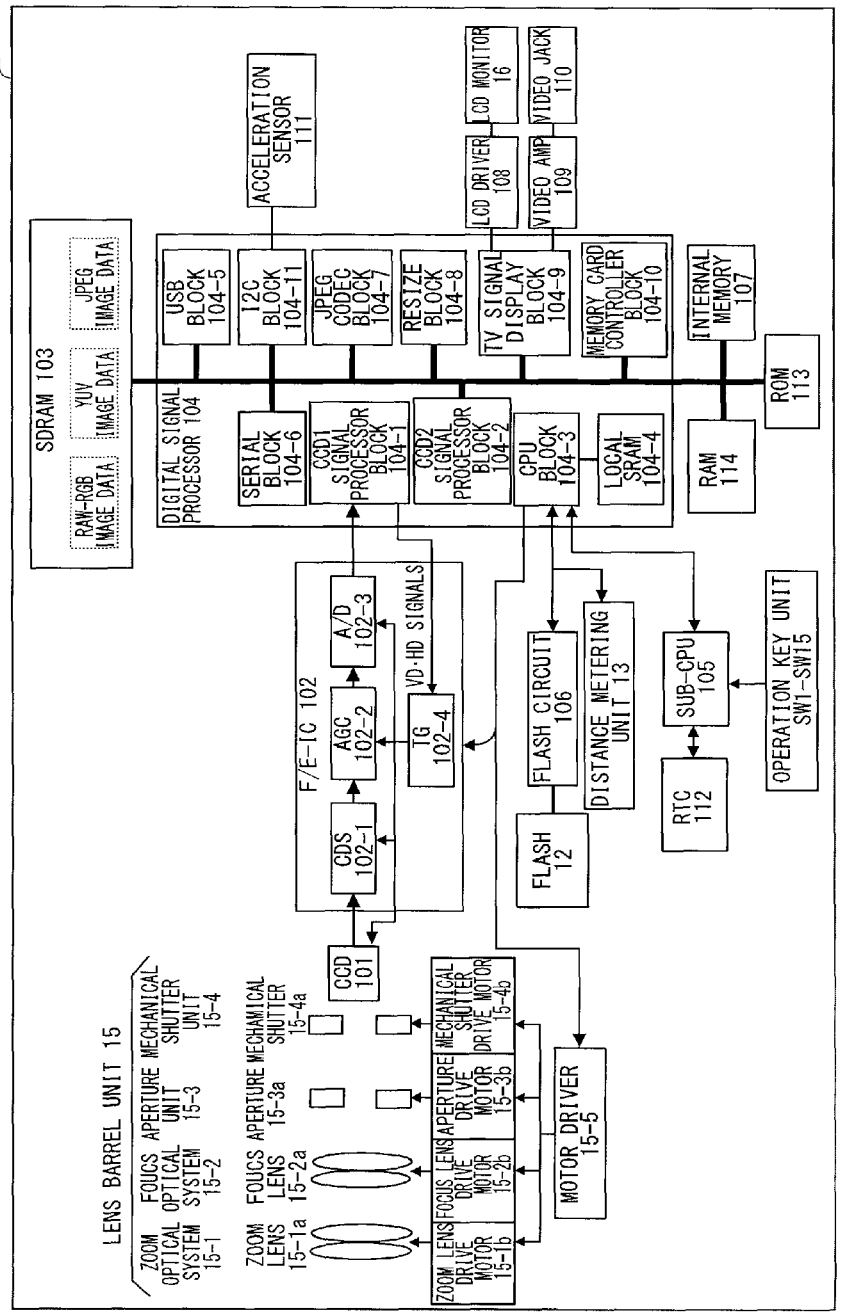
FIG. 4 is a diagram illustrating the entire system structure of the imaging apparatus according to the embodiment of the present invention.

Since the functions and operations of each member of the imaging apparatus 10 are well-known, explanations are omitted. Next, a system structure of the imaging apparatus 10 will be explained with reference to FIG. 4. FIG. 4 is a structure diagram illustrating the entire system structure of the imaging apparatus 10.

The CCD 101 is an image sensor that converts an optical image to electronic image information. A F/E (front-end)-IC 102 has a CDS 102-1, an AGC 102-2, an A/D converter 102-3, and a TG (timing generator) 102-4. The CDS 102-1 carries out correlated double sampling for image noise reduction.

The AGC 102-2 carries out gain adjustment. The A/D converter 102-3 converts an analog signal into a digital signal. A vertical synchronization signal VD, and a horizontal synchronization signal HD are supplied from a CCD1 signal processor block 104-1 of a later-described digital signal processor 104 to the TG 102-4. The TG 102-4 is controlled by the CPU block 104-3 and generates a drive-timing signal of the CCD 101 and the F/E-IC 102.

The lens barrel unit 15 is provided on the front face 11a of the body case 11. The lens barrel unit 15 has a zoom optical system 15-1, a focus optical system 15-2, an aperture unit 15-3, a mechanical shutter unit 15-4, and a motor driver 15-5. The zoom optical system 15-1 includes a zoom lens 15-1a that forms an optical image of a photographic subject, and a zoom lens drive motor 15-1b. The focus optical system 15-2 includes a focus lens 15-2a, and a focus lens drive motor 15-2b.

The aperture unit 15-3 includes an aperture 15-3a, and an aperture drive motor 15-3b. The mechanical shutter unit 15-4 includes a mechanical shutter 15-4a, and a mechanical shutter drive motor 15-4b. The motor driver 15-5 drives each motor of the lens barrel unit 15.

When the mechanical shutter 15-4a is operated, the CCD (image sensor) 101 receives light from a photographic subject via the zoom lens 105-1a, the focus lens 15-2a, and the aperture 15-3a.

A control program and a control parameter are stored in a ROM 113, and the control program and the control parameter are written by use of a code readable by the CPU block 104-3.

When the power of the imaging apparatus 10 is turned on, the control program is loaded in a main memory (not illustrated).

The CPU block 104-3 carries out operation control of each part of the apparatus in accordance with the control program. Necessary data and the like for this control are temporarily stored in a RAM 114 and a local SRAM 104-4 in the digital signal processor 104. By using a rewritable flash ROM as the ROM 113, it is possible to rewrite the control program and the control parameter; therefore it is easily possible to upgrade the functions of the imaging apparatus 10.

The digital signal processor 104 carries out a white balance setting, and a gamma setting on data that is inputted from the CCD 101 and then outputted from the F/E-IC 102. The digital signal processor 104 has the CCD1 signal processor block 104-1, a CCD2 signal processor block 104-2, the CPU block 104-3, the local SRAM 104-4, a USB block 104-5, a serial block 104-6, a JPEG CODEC block 104-7, a resize block 104-8, a TV signal display block 104-9, a memory card controller block 104-10, and a I2C block 104-11.

The CCD1 signal processor block 104-1 sends the vertical synchronization signal VD and the horizontal synchronization signal HD to the TG 102-4. The CCD2 signal processor block 104-2 carries out conversions to brightness data and color difference data by a filtering operation. The CPU block 104-3 controls the operation of each part of the apparatus.

The local SRAM 104-4 temporarily stores necessary data for the control. The USB block 104-5 performs USB communication with external devices such as a personal computer and so on. The serial block 104-6 performs serial communication with external devices such as a personal computer and so on. The JPEG CODEC block 104-7 performs JPEG compression and decompression.

The resize block 104-8 enlarges and reduces the size of image data by of an interpolation operation. The TV signal display block 104-9 converts image data into a video signal to be displayed on external display devices such as a liquid crystal monitor, a TV, and so on. The memory card controller block 104-10 controls a memory card that records photographed image data.

The SDRAM 103 temporarily stores image data when various operations are performed on image data in the digital signal processor 104. Image data to be stored, for example, are loaded from the CCD 101 via the F/E-IC 102, and are RAW-RGB image data that is data on which the white balance setting and the gamma setting are performed in the CCD1 signal processor block 104-1, YUV image data that is data on which the conversions to brightness data and color difference data are performed in the CCD2 signal processor block 104-2, JPEG image data that is data on which the JPEG compression is performed in the JPEG CODEC block 104-7, and so on. The internal memory 107 records the photographed image.

The LCD driver 108 is a drive circuit that drives the LCD monitor 16, and has a function that converts the video signal outputted from the TV signal display block 104-9 into a signal to be displayed on the LCD monitor 16. The LCD monitor 16 has various functions, such as monitoring the state of a photographic subject by use of image data obtained before shooting, confirming a photographed image, displaying image data recorded in a memory card or the internal memory 107, and so on.

The video AMP 109 is an amplifier that converts the video signal outputted from the TV signal display block 104-9 to an impedance of 75Ω. The video jack 110 is a jack that connects to external display devices such as a TV and so on.

The operation key unit (SW1 to SW15) is a key circuit operated by a user, and each of the switches SW1 to SW15 corresponds to the operation key unit. The SUB-CPU 105 is a central processing unit (CPU) that incorporates a ROM and a RAM in one chip, and outputs an output signal of the operation key unit SW1 to SW15 and so on as user's operation information to the CPU block 104-3. The SUB-CPU 105 controls time by communicating with an RTC (real time clock) 112 that keeps track of the current time.

The imaging apparatus 10 includes an acceleration sensor 111. The acceleration sensor 111 is capable of measuring acceleration, and is also capable of measuring gravity, that is, the degree of tilt with respect to the direction of gravity. Therefore, the tilt angle of the imaging apparatus 10 is detected by the acceleration sensor 111, and the acceleration sensor 111 functions as a tilt angle detector.

The acceleration sensor 111 is mounted on a printed circuit board (PCB), and outputs acceleration data to the I2C block 104-11. A known acceleration sensor is used as the acceleration sensor 111.

The digital signal processor 104 carries out serial communication with the acceleration sensor 111 via the I2C block 104-11, calculates the tilt of a camera from the obtained data, and displays a later-described roll angle with the photographed image on the LCD monitor 16 and so on. Calculation of the tilt angle of the camera is performed by the CPU block 104-3, for example.

Figure 5:
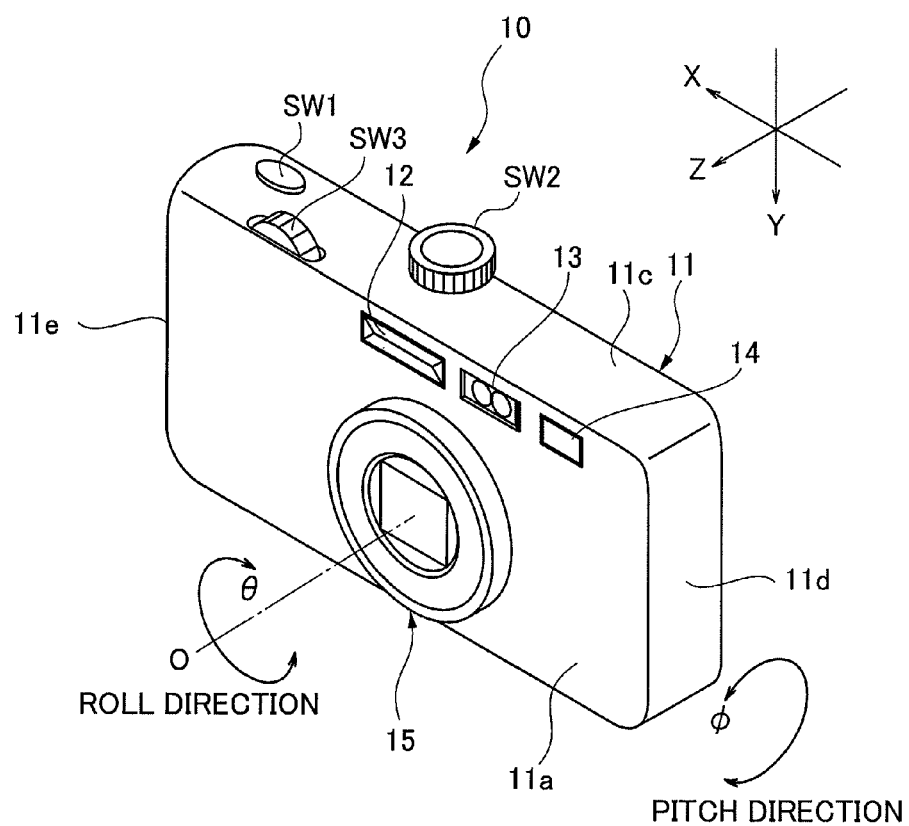
FIG. 5 is an explanatory diagram showing tilts of an imaging apparatus.

Next, the tilt angle is explained. As illustrated in FIG. 5, a roll direction is defined as a rotation direction around the Z-axis, and a pitch direction is defined as a rotation direction around the X-axis. A roll angle θ is defined as a tilt angle with respect to the X-axis, and a pitch angle φ is defined as a tilt angle with respect to the Z-axis.

Figure 6A:
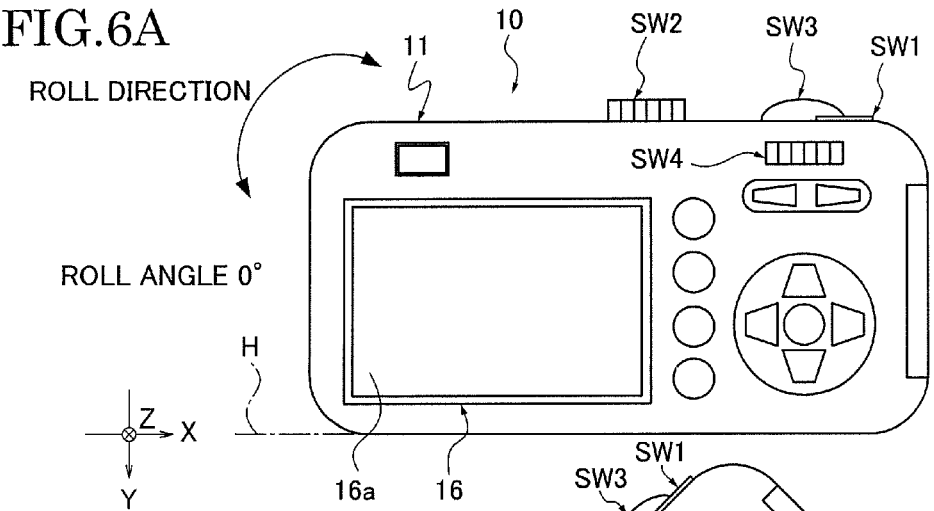
FIGS. 6A to 6C are explanatory diagrams illustrating examples of states where an imaging apparatus is tilted in a roll direction.
Figure 6B:
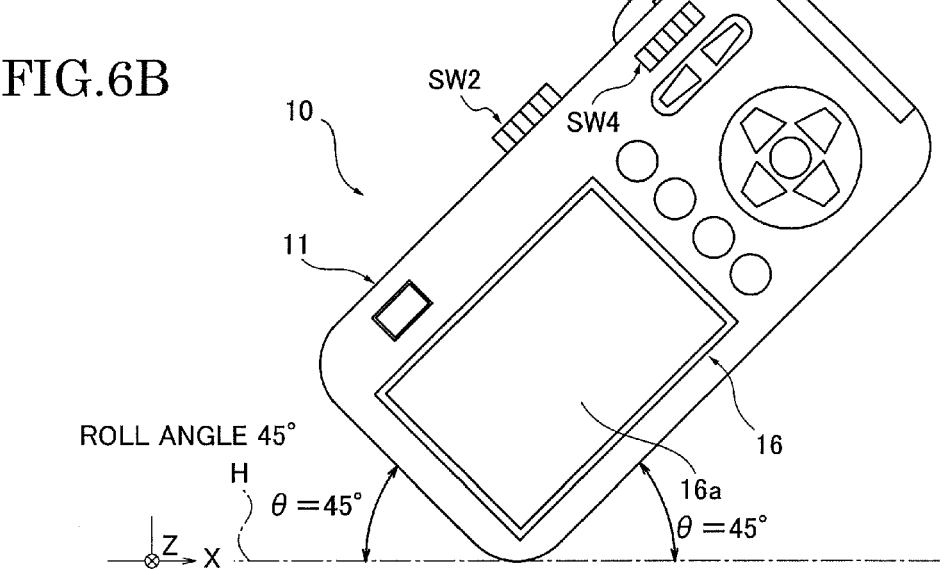
Figure 6C:
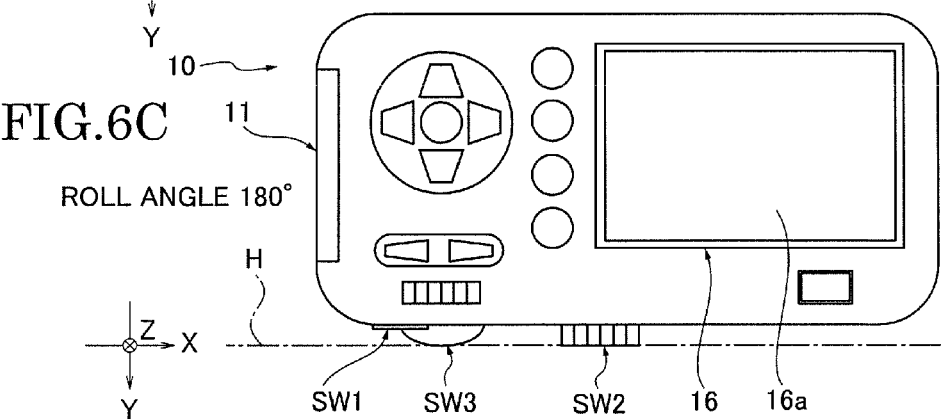

Due to the definition of the roll angle θ, seen from the rear face 11b of the body case 11, as illustrated in FIG. 6A, a state where an X-axis direction of the body case 11 is parallel to a horizontal plane (horizontal direction) H becomes a state where the roll angle θ=0 degrees, and as illustrated in FIG. 6B, a state where the body case 11 is at an angle of 45 degrees to the horizontal plane H becomes a state where the roll angle θ=45 degrees, and as illustrated in FIG. 6C, a state where the body case 11 is upside-down and parallel to the horizontal plane H is a state where the roll angle θ=180 degrees or −180 degrees.

A roll angle with respect to a horizontal state is obtained from the following expression by use of output values of the acceleration sensor 111.

$$\theta[\deg] = \frac{180}{\pi} * \{\arctan((Y - Y0)/(X - X0))\} \qquad \text{[Expression 1]}$$

Here, X is an output value (acceleration) in the X-axis direction, and Y is an output value (acceleration) in the Y-axis direction. X0 is an output value in the X-axis direction in zero gravity, and Y0 is an output value in the Y-axis direction in zero gravity.

A pitch angle φ is also obtained from the following expression by use of output values of the acceleration sensor 111.

$$\phi[\deg] = \frac{180}{\pi} * \frac{\arcsin(Z - Z0)}{\sqrt{((X - X0)^2 + (Y - Y0)^2 + (Z - Z0)^2)}} \qquad \text{[Expression 2]}$$

Here, Z is an output value in the Z-axis direction, and Z0 is an output value in zero gravity.

The digital signal processor 104 functions as an image processor that carries out image processing on electronic image information obtained via the CCD 101 to obtain image data. The LCD monitor 16 functions as an image display that displays the obtained image data on the monitor screen 16a of the LCD monitor 16, and the obtained image data is displayed as a monitor image.

The mode dial switch SW2, and the switches SW7 to SW11 function as a blurred area setter that sets a blurred area and a non-blurred area in the image data, in cooperation with the digital signal processor 104 and the LCD monitor 16.

That is, when the mode dial switch SW2 and the switches SW7 to SW11 are operated, the imaging apparatus 10 switches to shooting in miniature mode.

In the digital signal processor 104, a blurred area automatic changer that automatically changes the blurred area and the non-blurred area on the monitor screen 16a in accordance with a tilt angle obtained by the acceleration sensor 111 is provided.

Figure 7:
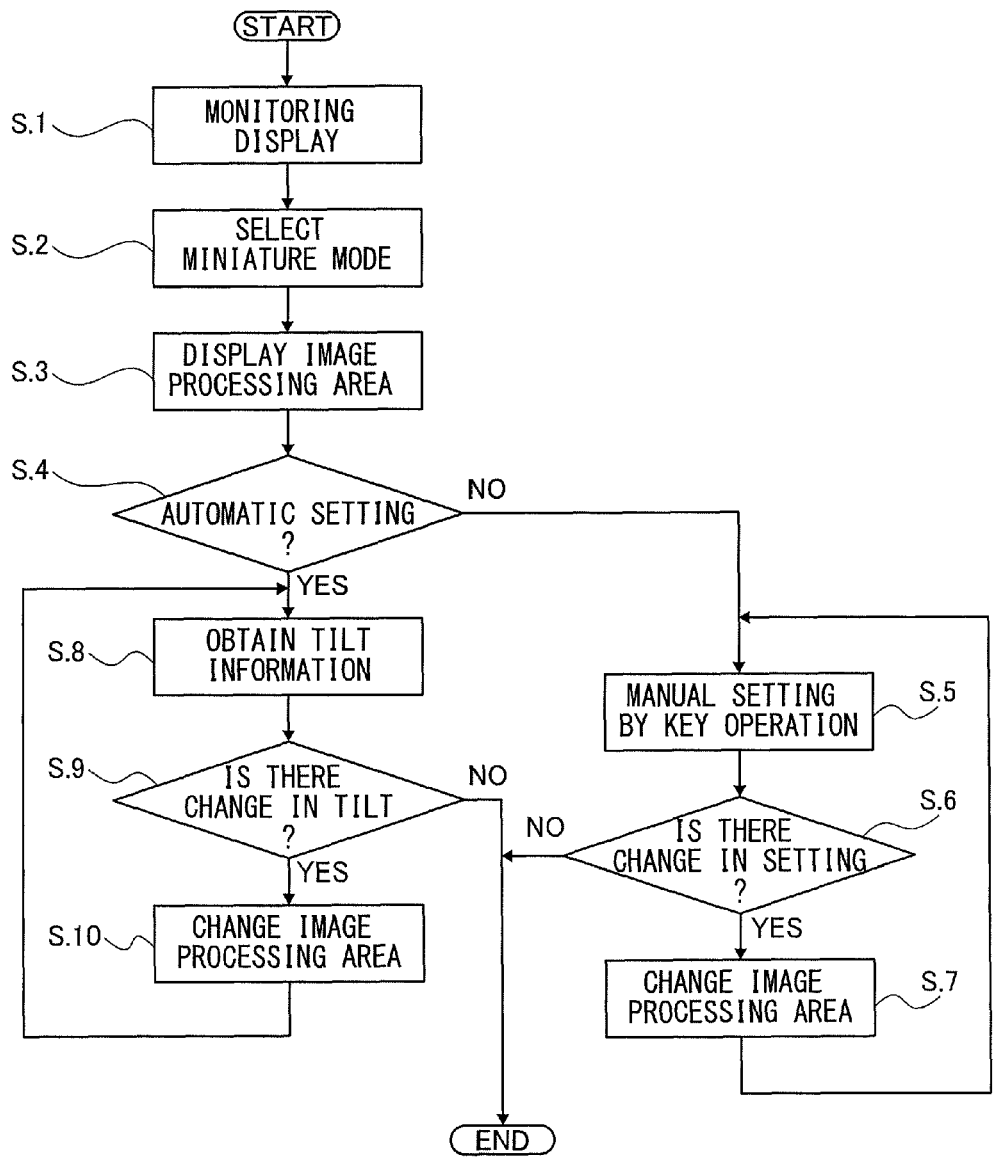
FIG. 7 is an example of an operation flowchart of the imaging apparatus according to the embodiment of the present invention.

Next, a function of the digital signal processor 104 as the image processor in miniature mode according to the embodiment of the present invention is explained with reference to a flowchart illustrated in FIG. 7.

In a state where the monitor image and the operation menu are displayed on the LCD monitor 16 (step S.1), when the mode dial switch SW2 and the switches S7 to S11 are operated to select the miniature mode (step S.2), the imaging apparatus 10 switches to the miniature mode.

When the mode is switched to the miniature mode, an area where a blurring operation is performed is displayed on the LCD monitor 16 (step S.3).

Figure 8:
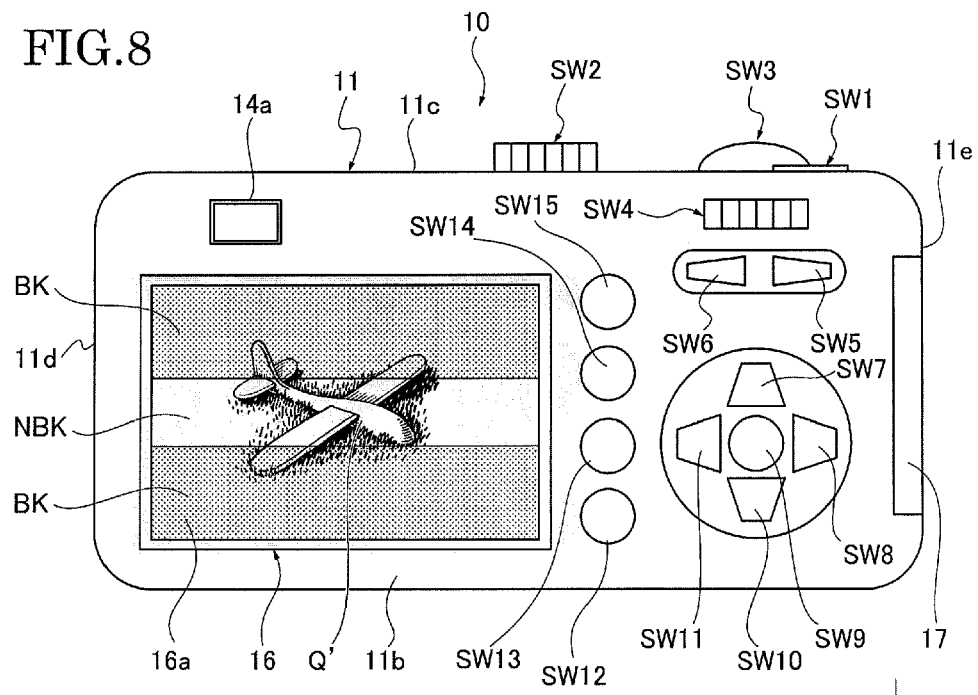
FIG. 8 is an explanatory diagram illustrating a display example of a monitor screen in the case of a blurring operation in a conventional miniature mode.

FIG. 8 illustrates the imaging apparatus 10 on which a blurred area BK is displayed. In FIG. 8, an example of setting the blurred area BK is illustrated under a shooting condition where a photographic subject Q (see FIG. 14) is photographed in a state where the imaging apparatus 10 is in the horizontal state.

Next, the image processor determines whether or not an automatic setting of the blurring operation is performed (step S.4), and in the case where the automatic setting of the blurring operation is not performed, the flow proceeds to step S.5, and a manual setting by the operation key unit is performed (step S.5).

And then, the image processor determines whether or not the setting of the blurred area BK should be changed (step S.6).

Figure 9:
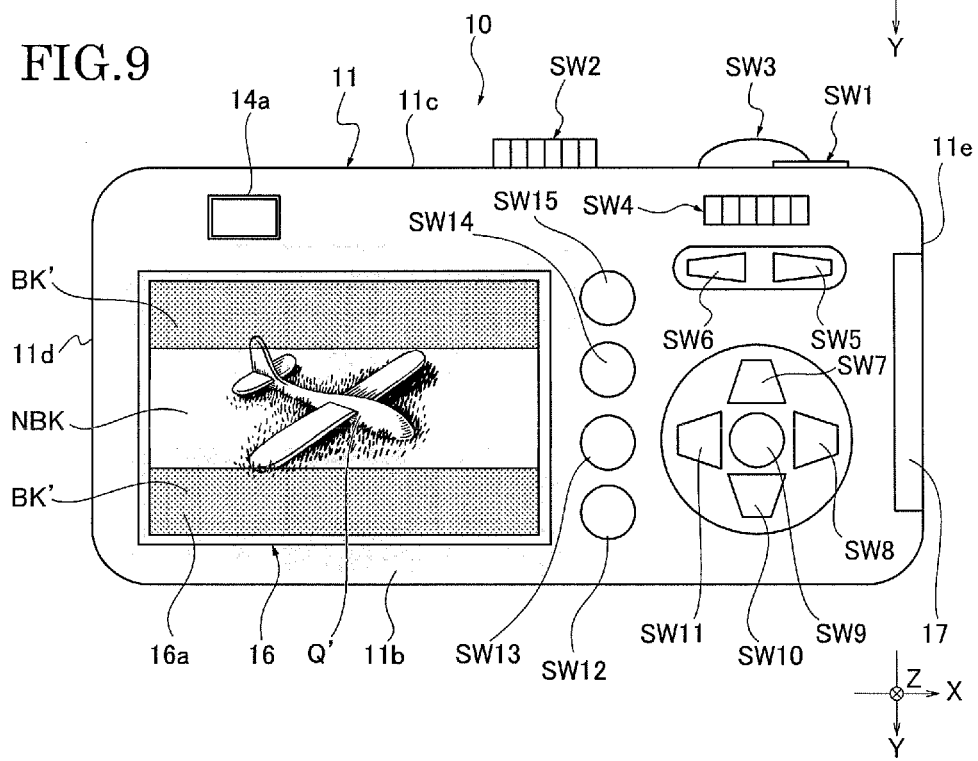
FIG. 9 is an explanatory diagram illustrating an example of a change of a setting of a blurred area illustrated in FIG. 8.

In the case where the setting of the blurred area BK is changed, the image processor executes a blurring operation area change operation (image processing area change operation) in step S.7, and then the flow returns to step S.5. By changing the setting of the blurred area BK, for example, as illustrated in FIG. 9, the blurred area is changed to a blurred area BK' from the blurred area BK.

In the case where the setting of the blurred area is not changed, in step S.6, a determination of NO is made, and the setting of the blurred area ends. Note that NBK is a non-blurred area.

Figure 10:
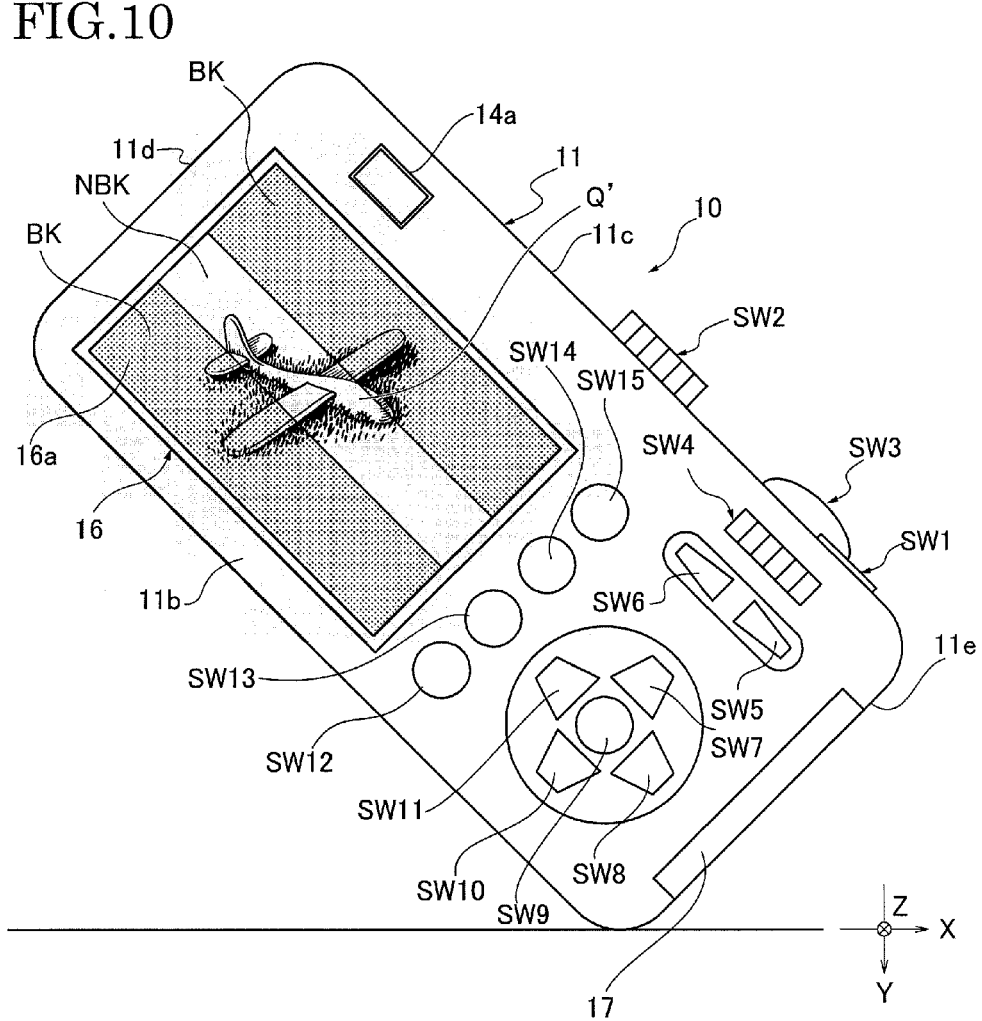
FIG. 10 is an explanatory diagram of a blurred area in a case where a conventional imaging apparatus illustrated in FIG. 8 is tilted.

The operation steps of step S.5 to step S.7 correspond to a blurring operation of a conventional imaging apparatus, for example, in a state where a blurred area BK illustrated in FIG. 8 has been set, and when shooting is performed in a state where the imaging apparatus 10 is tilted with respect to the X-axis, that is, when shooting is performed using the imaging apparatus 10 being tilted with respect to a photographic subject Q (see FIG. 14), a photographic subject image Q' illustrated in FIG. 10 is displayed on the LCD monitor 16, which is different from a user's intention. This is because, in order to obtain a miniature faking image, a blurring operation has to be performed on the photographic subject Q in the horizontal direction.

In step S.4, in the case where the automatic setting of the blurring operation is selected, the flow proceeds to step S.8, and the image processor obtains tilt angle information of the imaging apparatus 10. Then, the image processor determines whether or not there is a change in the tilt angle (step S.9), and in a case where there is a change in the tilt angle, the image processor executes the blurring operation area change (image processing area change) operation (step S.10), and then the flow returns to step S.8. Next, the flow proceeds to step S.9, and in the case where there is no change in the tilt angle, in step S.9, a determination of NO is made, and the automatic setting of the blurred area BK ends.

Figure 11:
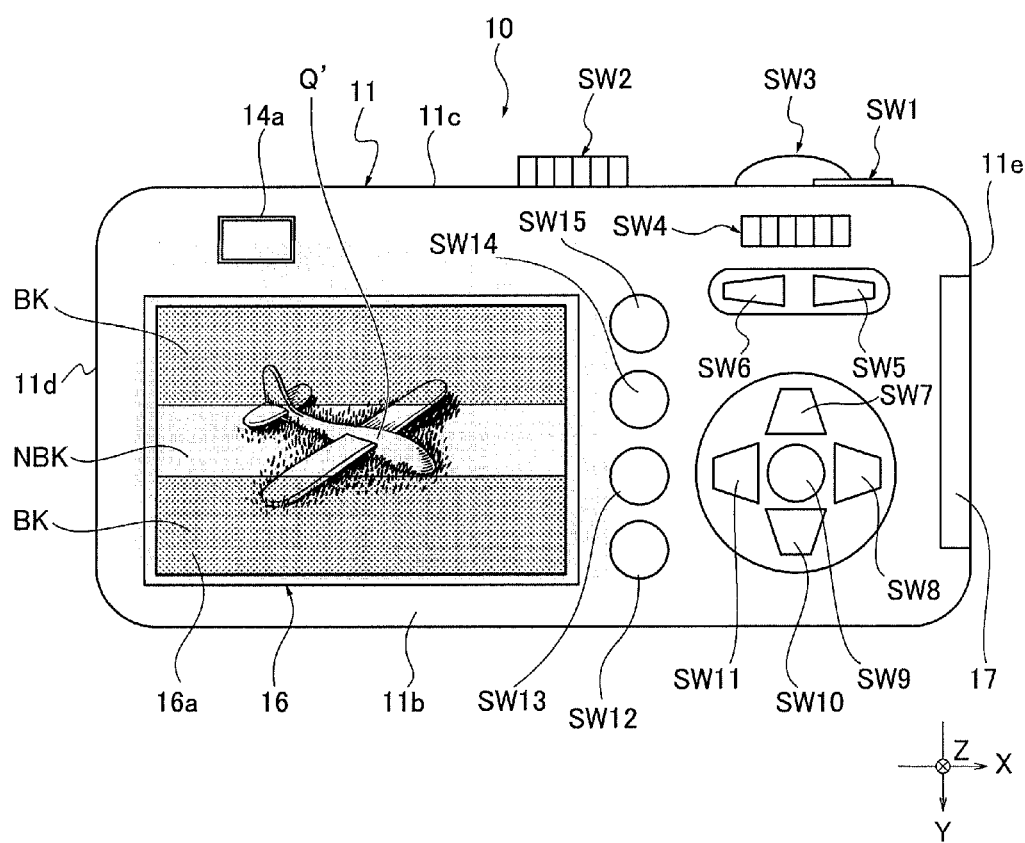
FIG. 11 is an explanatory diagram illustrating an example of a blurring operation in the case where the imaging apparatus according to the embodiment of the present invention is tilted in a roll direction, and a display example of a blurring operation image in the case where a roll angle is 0 degrees.
Figure 12:
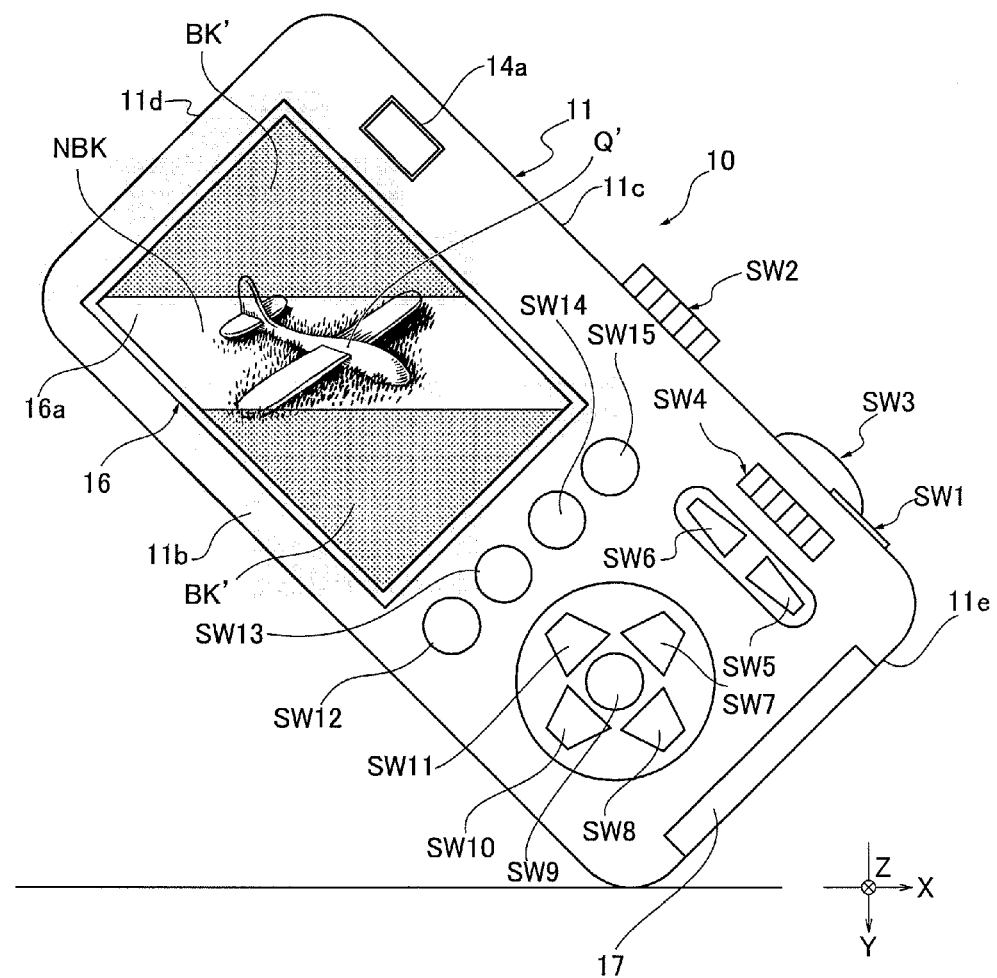
FIG. 12 is an explanatory diagram illustrating an example of a blurring operation in the case where the imaging apparatus according to the embodiment of the present invention is tilted in a roll direction, and a display example of a blurring operation image in the case where a roll angle is 45 degrees.
Figure 13:
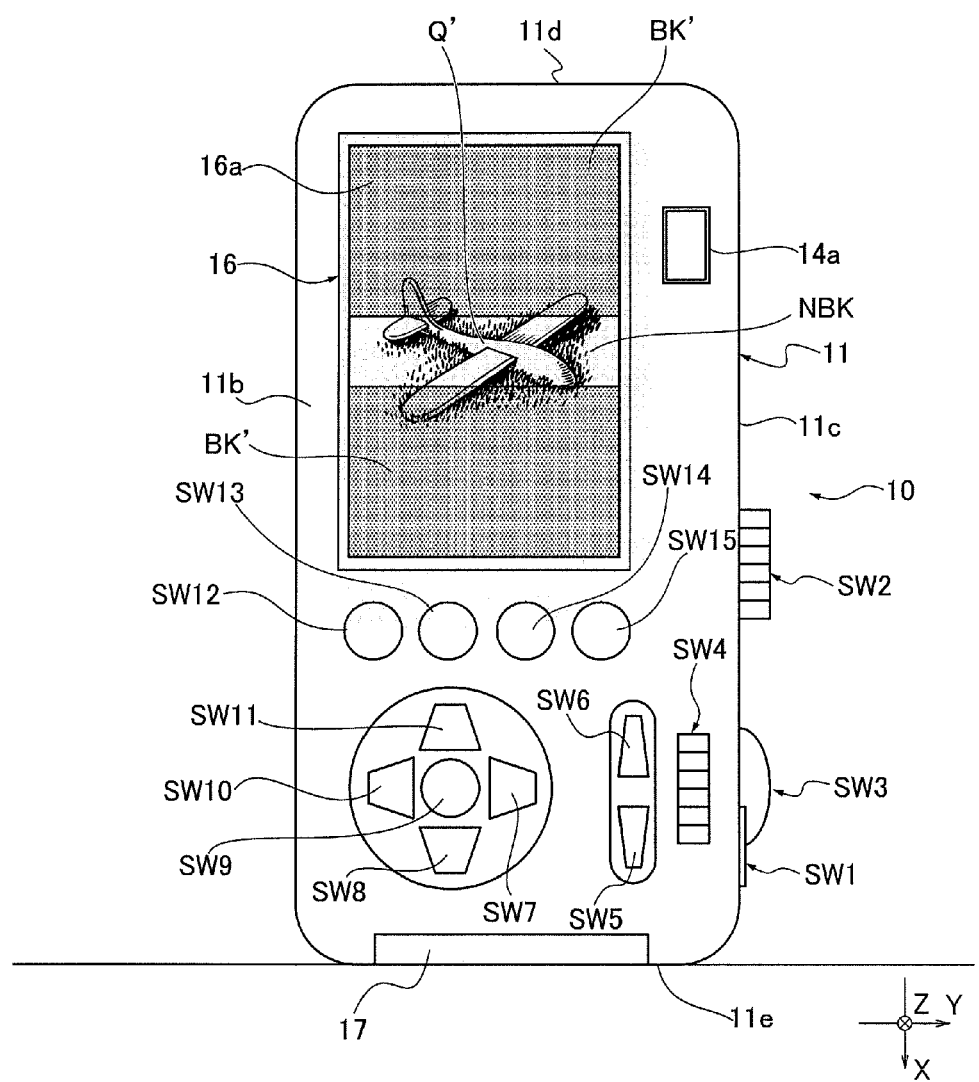
FIG. 13 is an explanatory diagram illustrating an example of a blurring operation in the case where the imaging apparatus according to the embodiment of the present invention is tilted in a roll direction, and a display example of a blurring operation image in the case where a roll angle is 90 degrees.

The operation steps of step S.8 to step S.10 correspond to a blurring operation in the miniature mode according to the embodiment of the present invention. For example, as illustrated in FIG. 11, a blurred area BK is set to the case where a roll angle θ of the imaging apparatus 10 is 0 degrees. When the imaging apparatus 10 is tilted at a roll angle of 45 degrees, the image processor changes the blurred area from the blurred area BK to a blurred area BK' as illustrated in FIG. 12, and when the imaging apparatus 10 is tilted at a roll angle of 90 degrees, the imaging apparatus 10 changes the blurred area from the blurred area BK to a blurred area BK' as illustrated in FIG. 13.

Here, in the case where the automatic setting of this blurring operation is selected, the blurred area BK and the non-blurred area NBK are set to be parallel to the X-axis, and a ratio on a screen of the LCD monitor 16 is set to a predetermined ratio, in a state where the body case 11 (imaging apparatus) is maintained to be in a right posture (roll angle=0 degrees, pitch angle=0 degrees).

Figure 15:
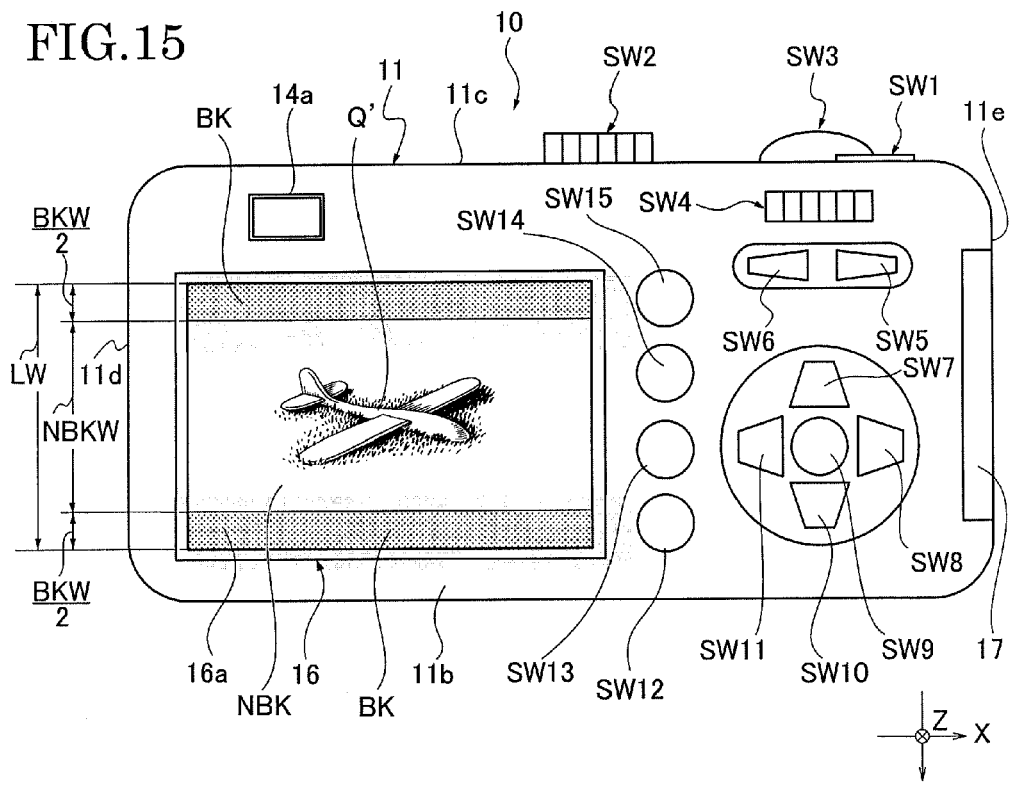
FIG. 15 is an explanatory diagram illustrating an example of a blurring operation in the case where the imaging apparatus is tilted in a pitch direction, and a display example of a blurring operation image in the case where a pitch angle is 0 degrees.

Here, in the right posture, the image processor sets, for example, as illustrated in FIG. 15, a ratio of a screen width BKW in the vertical direction of the blurred area BK to a screen width LW in the vertical direction of the LCD monitor 16 to 1:6, and a ratio of a screen width NBKW in the vertical direction of the non-blurred area NBK to the screen width LW in the vertical direction of the LCD monitor 16 to 5:6.

The image processor is configured to change a ratio of the blurred area BK to the non-blurred area NBK, as the pitch angle increases.

Here, when the pitch angle φ increases from 0 degrees to 90 degrees or 0 degrees to −90 degrees, the ratio of the blurred area BK is set to increase.

When the pitch angle φ exceeds 90 degrees to 180 degrees or −90 degrees to −180 degrees, the ratio of the blurred area BK is set to become symmetrically small.

Figure 14:
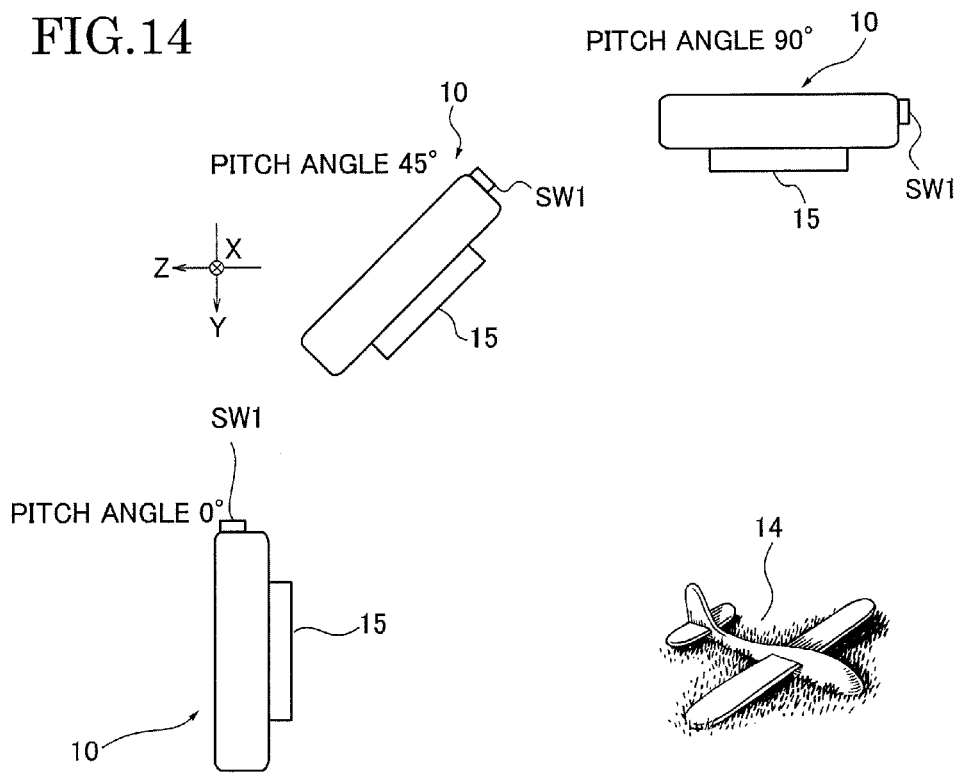
FIG. 14 is an explanatory diagram illustrating states where imaging apparatuses are tilted in a pitch direction.
Figure 16:
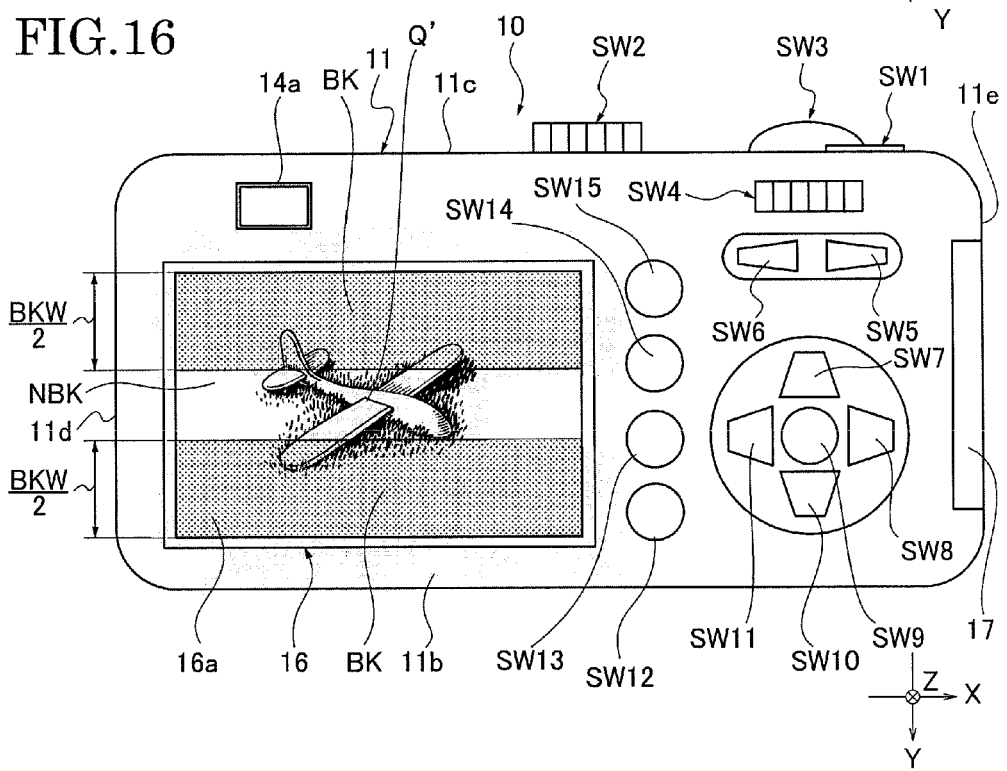
FIG. 16 is an explanatory diagram illustrating an example of a blurring operation in the case where the imaging apparatus is tilted in a pitch direction, and a display example of a blurring operation image in the case where a pitch angle is 45 degrees.
Figure 17:
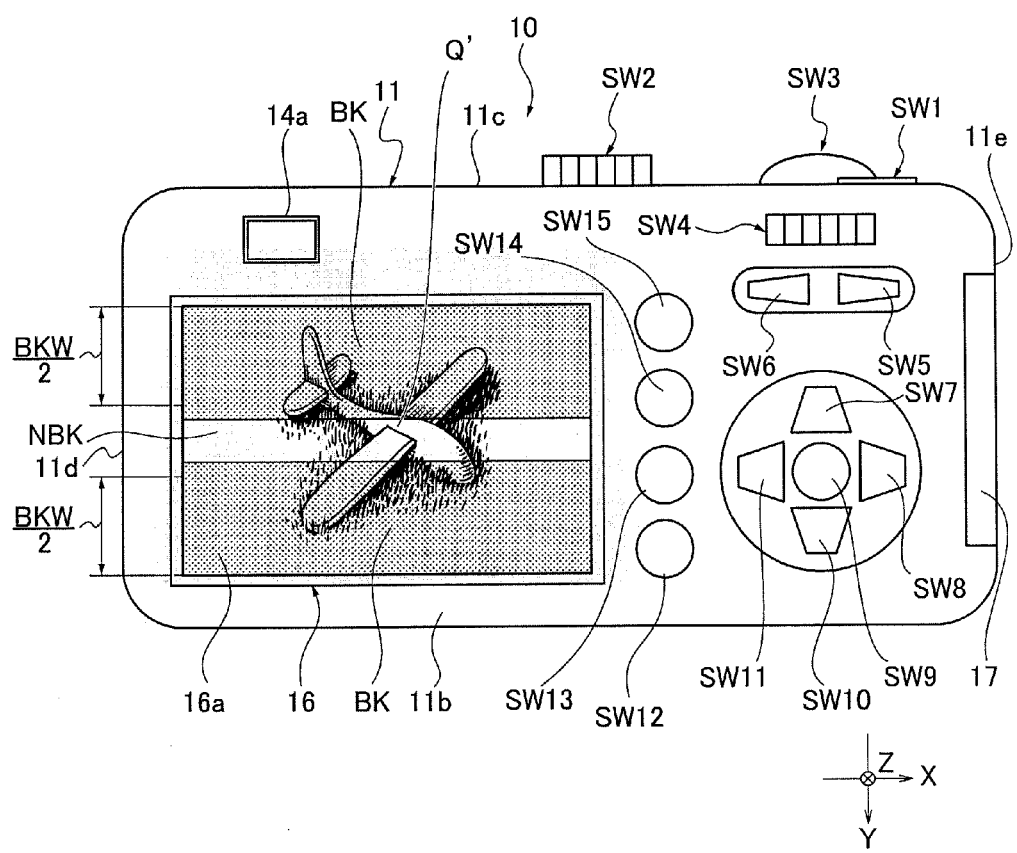
FIG. 17 is an explanatory diagram illustrating an example of a blurring operation in the case where the imaging apparatus is tilted in a pitch direction, and a display example of a blurring operation image in the case where a pitch angle is 90 degrees.

For example, in the case where the blurred area BK is set as illustrated in FIG. 15 when the pitch angle φ of the imaging apparatus 10 is 0 degrees as illustrated in FIG. 14, if the pitch angle φ of the imaging apparatus is tilted at 45 degrees, as illustrated in FIG. 16, the setting of the blurred area BK is automatically changed in a direction where the screen width BKW of the blurred area BK extends, and if the pitch angle φ of the imaging apparatus 10 is tilted at 90 degrees, as illustrated in FIG. 17, the setting of the blurred area BK is changed in a direction where the screen width BKW of the blurred area BK further extends.

That is, in accordance with the tilt of the pitch angle φ of the imaging apparatus 10, an operation that automatically enlarges/reduces the screen width BKW of the blurred area BK is performed.

In the explanation of the present embodiment, the direction of gravity is defined as the Y-axis, the direction of the photographing optical axis O is defined as the Z-axis, a state where the imaging apparatus 10 is in the right posture is defined as the X-axis, the tilt angle with respect to the X-axis of the imaging apparatus 10 is defined as the roll angle θ, and the tilt angle with respect to the Z-axis is defined as the pitch angle φ. However, a horizontal direction of the body case (imaging apparatus) 11 is defined as an X-axis, a vertical direction of the body case (imaging apparatus) 11 is defined as a Y-axis, a direction of a photographing optical axis O is defined as a Z-axis, and an arbitrary posture of the body case (imaging apparatus) 11 is defined as a reference posture, and a tilt angle of the body case 11 as a tilt angle from the reference posture is detected, and the blurred area can also be set by this tilt angle.

In the embodiment, the blurred area BK and the non-blurred area NBK are set to be parallel to the X-axis; however the blurred area BK and the non-blurred area NBK can be set to be parallel to the Y-axis.

In the embodiment, a still-photography shooting has been explained. However, the embodiment according to the present invention can also be applied to a moving image shooting.

In the case where a moving image shooting is performed by holding an imaging apparatus (camera), camera shake tends to occur, and if a blurring operation is performed under conditions set before the moving image shooting, when the imaging apparatus is tilted by shake, a desired effect in miniature mode is not obtained. However, according to the embodiment, the blurred area is automatically changed in accordance with the tilt angle of the imaging apparatus, therefore it is possible to obtain the desired effect in the miniature mode in the moving image shooting as well.

According to the embodiment of the present invention, since a tilt angle of an imaging apparatus is detected by a tilt angle detector, and a change of a setting of a blurring operation is automatically performed by use of the tilt angle of the imaging apparatus, it is possible to improve user-usability.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus comprising:
    an image sensor that converts an optical image to electronic image information;
    an image processor that carries out image processing on the electronic image information obtained via the image sensor to obtain image data;
    a tilt angle detector that detects a tilt angle of the imaging apparatus;
    an image display that displays the image data; and
    a blurred area setter that sets a blurred area and a non-blurred area to the image data in cooperation with the image processor and the image display,
    wherein a blurred area automatic changer that automatically changes the blurred area and the non-blurred area on the image display in accordance with the tilt angle of the imaging apparatus obtained by the tilt angle detector is provided in the image processor.

2. The imaging apparatus according to claim 1, wherein when a direction of gravity is defined as a Y-axis, a direction of a photographing optical axis of the imaging apparatus is defined as a Z-axis, a direction perpendicular to a plane including the Y-axis and the Z-axis is defined as an X-axis, a tilt angle with respect to the X-axis is defined as a roll angle, and a tilt angle with respect to the Z-axis is defined as a pitch angle, the angle detector detects at least one tilt angle of the roll angle and the pitch angle.

3. The imaging apparatus according to claim 2, wherein when the roll angle and the pitch angle of the imaging apparatus are 0 degrees, the image processor carries out a blurring operation such that a display of the blurred area and the non-blurred area on the image display becomes parallel to the X-axis or the Y-axis.

4. The imaging apparatus according to claim 3, wherein the blurred area automatic changer automatically changes the blurred area in accordance with a roll angle obtained by the tilt angle detector such that the blurred area and the non-blurred area keep parallel to the X-axis or the Y-axis.

5. The imaging apparatus according to claim 2, wherein when the roll angle and the pitch angle of the imaging apparatus are 0 degrees, the image processor sets a display ratio of the blurred area to the non-blurred area on the image display to a predetermined ratio.

6. The imaging apparatus according to claim 5, wherein the blurred area automatic changer changes the display ratio of the blurred area to the non-blurred area on the image display in accordance with the pitch angle.

7. The imaging apparatus according to claim 6, wherein as the pitch angle increases from 0 degrees to 90 degrees or 0 degrees to −90 degrees, the blurred area automatic changer changes the display ratio of the blurred area to the non-blurred area on the image display such that the display ratio of the blurred area on the image display increases.

8. The imaging apparatus according to claim 1, wherein the angle detector defines a horizontal direction, a vertical direction, and a direction of a photographing optical axis of the imaging apparatus as an X-axis, a Y-axis, and a Z-axis, respectively, and detects a tilt angle with respect to an arbitrary reference posture.

9. The imaging apparatus according to claim 1, wherein an image displayed on the image display is a still image or a moving image.

* * * * *

UNITED STATES PATENT AND TRADEMARK OFFICE
CERTIFICATE OF CORRECTION

PATENT NO. : 8,593,543 B2  
APPLICATION NO. : 13/288567  
DATED : November 26, 2013  
INVENTOR(S) : Hideki Kobayashi Page 1 of 1

It is certified that error appears in the above-identified patent and that said Letters Patent is hereby corrected as shown below:

In the Specification:

In Column 5, Line 34 delete "of".

It should read:

"image data by an interpolation operation".

Signed and Sealed this  
Fifteenth Day of April, 2014

Michelle K. Lee  
*Deputy Director of the United States Patent and Trademark Office*